(12) United States Patent
Rangapuram et al.

(10) Patent No.: US 11,513,715 B2
(45) Date of Patent: Nov. 29, 2022

(54) METHOD AND SYSTEM FOR GENERATING SYNTHETIC BACKUPS USING BLOCK BASED BACKUPS

(71) Applicant: EMC IP Holding Company LLC, Hopkinton, MA (US)

(72) Inventors: Ravi Kishore Yadav Rangapuram, Bangalore (IN); Manjunath Jagannatha, Bangalore (IN); Kiran Kumar Madiraju Varadaraju, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/988,524

(22) Filed: Aug. 7, 2020

(65) Prior Publication Data

US 2022/0043574 A1 Feb. 10, 2022

(51) Int. Cl.
*G06F 3/06* (2006.01)
*G06F 16/11* (2019.01)

(52) U.S. Cl.
CPC ............ *G06F 3/065* (2013.01); *G06F 3/0619* (2013.01); *G06F 3/0673* (2013.01); *G06F 16/122* (2019.01)

(58) Field of Classification Search
CPC ...... G06F 3/065; G06F 3/0619; G06F 3/0673; G06F 16/122
See application file for complete search history.

(56) References Cited

U.S. PATENT DOCUMENTS

| | | | |
|---|---|---|---|
| 9,430,332 B1* | 8/2016 | Bahadure | G06F 16/128 |
| 9,703,644 B1* | 7/2017 | Jagannatha | G06F 11/1435 |
| 9,940,203 B1* | 4/2018 | Ghatnekar | G06F 16/13 |
| 10,078,555 B1 | 9/2018 | Kumar et al. | |
| 10,241,871 B1 | 3/2019 | Cheng | |
| 2014/0164330 A1* | 6/2014 | Barnes | G06F 11/1451 707/646 |
| 2016/0314046 A1* | 10/2016 | Kumarasamy | G06F 11/1451 |
| 2018/0253359 A1* | 9/2018 | Zhang | G06F 11/1464 |
| 2019/0311040 A1 | 10/2019 | Nayak et al. | |

\* cited by examiner

*Primary Examiner* — Nanci N Wong
(74) *Attorney, Agent, or Firm* — Chamberlain, Hrdlicka, White, Williams & Aughtry

(57) ABSTRACT

A method that is performed for backing up data. The method includes obtaining, by a backup storage, an incremental backup request; and in response to the incremental backup request, identifying backup extents of a full backup associated with the incremental backup request using backup metadata; generating an intermediate backup file comprising the backup extents, wherein each of the backup extents is a reference to a correspond data block; obtaining modified data blocks from a production host; and updating the intermediate backup file using on the modified data blocks to generate a virtual synthetic backup file.

17 Claims, 10 Drawing Sheets

METHOD AND SYSTEM FOR GENERATING SYNTHETIC BACKUPS USING BLOCK BASED BACKUPS

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method performed for backing up data. The method includes obtaining, by a backup storage, an incremental backup request; and in response to the incremental backup request, identifying backup extents of a full backup associated with the incremental backup request using backup metadata; generating an intermediate backup file comprising the backup extents, wherein each of the backup extents is a reference to a correspond data block; obtaining modified data blocks from a production host; and updating the intermediate backup file using on the modified data blocks to generate a virtual synthetic backup file.

In general, in one aspect, the invention relates to a system that is used for backing up data. The system includes a processor and a file system manager of a backup storage, which when executed by the processor performs a method. The method includes obtaining, by a backup storage, an incremental backup request; and in response to the incremental backup request, identifying backup extents of a full backup associated with the incremental backup request using backup metadata; generating an intermediate backup file comprising the backup extents, wherein each of the backup extents is a reference to a correspond data block; obtaining modified data blocks from a production host; and updating the intermediate backup file using on the modified data blocks to generate a virtual synthetic backup file.

In general, in one aspect, the invention relates to a non-transitory computer readable medium which includes computer readable program code, which when executed by a computer processor enables the computer processor to perform a method for backing up data. The method includes obtaining, by a backup storage, an incremental backup request; and in response to the incremental backup request, identifying backup extents of a full backup associated with the incremental backup request using backup metadata; generating an intermediate backup file comprising the backup extents, wherein each of the backup extents is a reference to a correspond data block; obtaining modified data blocks from a production host; and updating the intermediate backup file using on the modified data blocks to generate a virtual synthetic backup file.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for backing up data. More specifically, embodiments of the invention relate to generating a virtual synthetic backup on a backup storage without synthetic backup functionality using a fast copy feature of the file system operating on a backup storage. Further, in various embodiments of the invention, an intermediate backup file is generated using the fast copy feature by sharing the backup extents of a previous backup with the intermediate backup.

The intermediate backup may be updated with modified data blocks obtained using a changed block tracking driver to generate an incremental backup. The incremental backup may then be used in combination with the previous backup to generate a virtual synthetic backup.

Figure 1A:
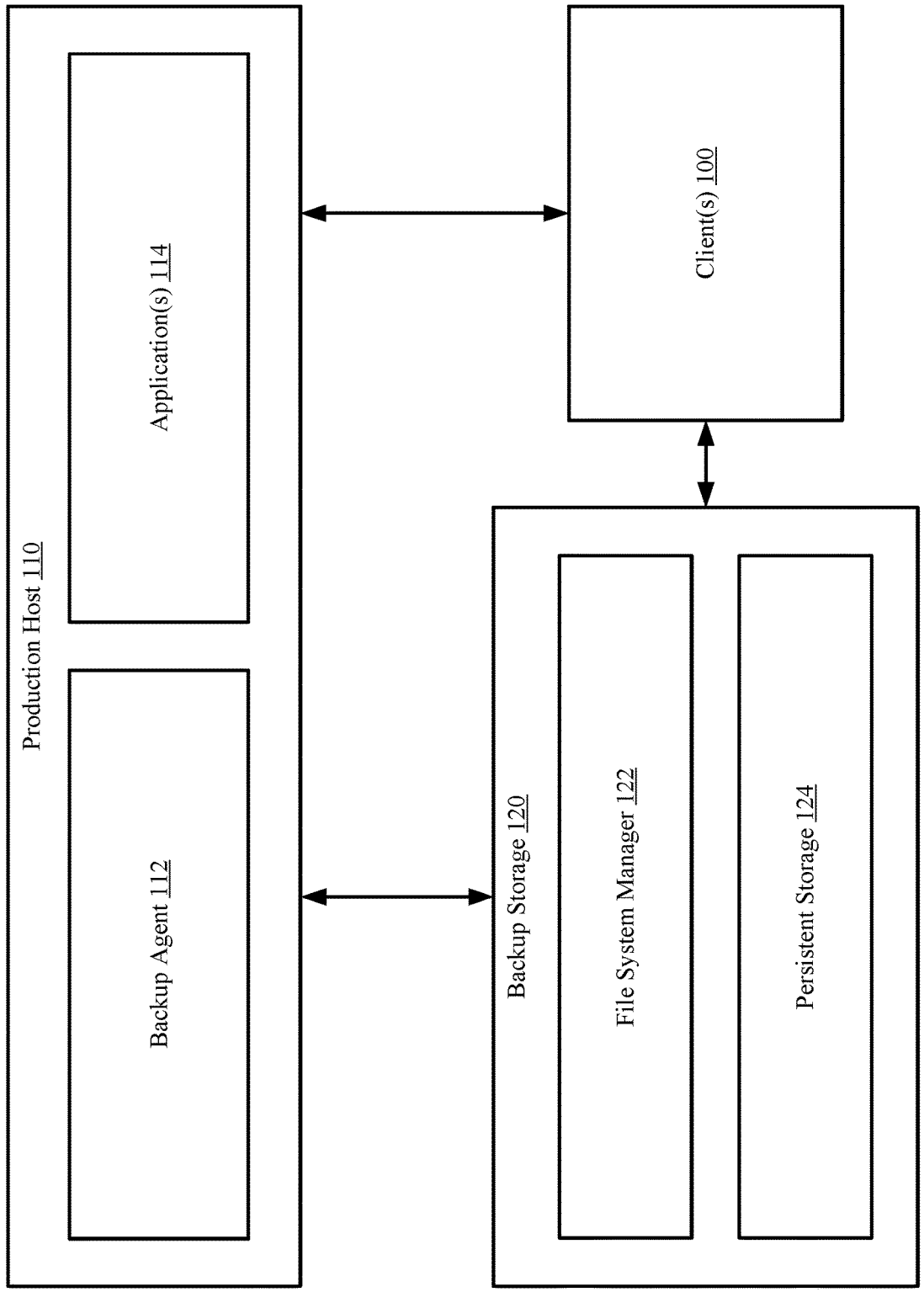
FIG. 1A shows a diagram of a system in accordance with one or more embodiments of the invention.

FIG. 1A shows a diagram of a system in accordance with one or more embodiments of the invention. The system may include client(s) (100), a production host (110), and backup storage (120). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) provides services to the client(s) (100). The production host (110) may include a backup agent (112) and application(s) (114). The production host (110) may include additional, fewer, and/or different components without departing from the invention. Each of the aforementioned components of the production host (110) is discussed below.

In one or more embodiments of the invention, the production host (110) includes a backup agent (112). The backup agent (112) may include functionality for generating copies of data blocks of assets of a file system and providing the copies of data blocks to the backup storage (120). In one or more embodiments of the invention, a file system is an organizational data structure that tracks how data is stored and retrieved in a system (e.g., in persistent storage of the production host (110)). The file system may specify references to assets and any data blocks associated with each asset. An asset may include one or more objects in the file system. An asset may be, for example, a folder or a file. An example of an object is a file. The backup generated may include a copy of the assets for one or more specified applications associated with a specified point in time. The copies of data blocks may be used to generate full backups, incremental backups, and virtual synthetic backups via the methods illustrated in FIGS. 3A-3B.

In one or more embodiments of the invention, the backup agent (112) may further include functionality for tracking changes to assets of the file system and to provide the modified data blocks associated with the changed assets to the backup storage. The backup agent (112) may include, for example, a changed block tracking driver (not shown). The changed block tracking driver may be computer instructions that when executed by a processor of the production host (110), provide the functionality to track changes made to data blocks stored in persistent storage (not shown) of the production host (110). The backup agent (112) may obtain requests from the backup storage (120) to provide modified data blocks associated with an asset to the backup storage (120). The backup agent (112) may use the aforementioned changed block tracking driver to identify and provide the modified blocks to the backup storage (120). The data blocks may be stored contiguously or non-contiguously in the persistent storage (not shown) on the production host (110) and the backup storage (120). In other words, data blocks in stored in portions of a persistent storage system that are physically located near each other (e.g., next to each other). The backup agent (112) may include other and/or additional functionality without departing from the invention.

In one or more embodiments of the invention, the backup agent (112) may generate and provide to the backup storage the copies of data blocks of assets of the file system based on backup policies implemented by the backup agent (112). The backup policies may specify a schedule in which the applications (e.g., 114) are to be backed up. The backup agent (112) may be triggered to generate a copy of data blocks of an asset and provide the data block copies to the backup storage (120) in response to a backup policy. Alternatively, one or more of the copies of data blocks of assets may be generated and provided to the backup storage (120) in response to a backup request triggered by the client(s) (100). The backup request may specify the application(s) (114) to be backed up.

In one or more embodiments of the invention, the backup agent (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (112) described throughout this application.

In one or more embodiments of the invention, the backup agent (112) is implemented as computer instructions, e.g., computer code, stored on a persistent storage that when executed by a processor of the production host (110) causes the production host (110) to provide the functionality of the backup agent (112) described throughout this application.

In one or more embodiments of the invention, the production host (110) hosts one or more application(s) (114). In one or more embodiments of the invention, the application(s) (114) perform services for clients (e.g., 100). The services may include writing, reading, and/or otherwise modifying data that is stored in the production host (110). The application(s) (114) may each include functionality for writing data to the production host (110). The application(s) (114) may be, for example, instances of databases, email servers, and/or other applications. The production host (110) may host other types of applications without departing from the invention.

In one or more of embodiments of the invention, the application(s) (114) is implemented as computer instructions, e.g., computer code, stored on a persistent storage that when executed by a processor(s) of the production host (110) cause the production host (110) to provide the functionality of the application(s) (114) described throughout this application.

Figure 5:
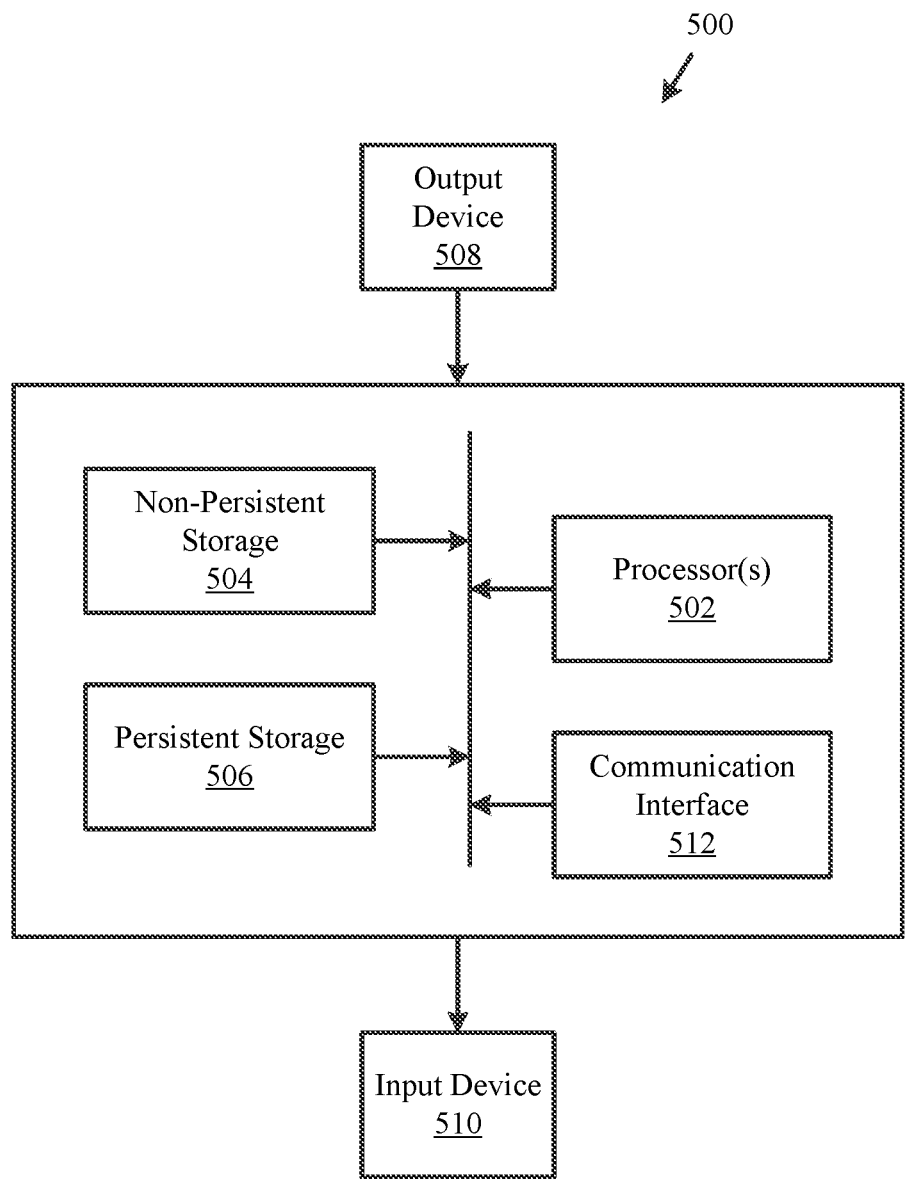
FIG. 5 shows a diagram of a computing device in accordance with one or more embodiments of the invention.

In one or more embodiments of the invention, the production host (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the client(s) (100) utilize services provided by the production host (110). Specifically, the client(s) (100) may utilize the applications in the applications (114) to obtain, modify, and/or store data. The data may be generated from applications hosted in the application (114).

In one or more embodiments of the invention, a client(s) (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage (120) includes the functionality to generate and store backups of assets of the file system using copies of data blocks obtained from the backup agent (112) of the production host (110). The backup storage (120) may include a file system manager (122) and persistent storage (124). The backup storage (120) may include other and/or additional components without departing from the invention. Each of the components of the backup storage (120) is discussed below.

The backup storage (120) may not include the functionality to generate virtual synthetic backups or generate virtual synthetic backups in an efficient manner. The backup storage (120) may use the features of the file system operating on the backup storage (120) to generate virtual synthetic backups. The backup storage (120) may include a file system that includes a fast copy feature (also referred to as a reflink feature). The fast copy feature enables the backup storage to share backup extents, or portions of backup extents, (discussed below) between backup files on the backup storage (120). The fast copy feature may enable the backup storage (120) to generate virtual synthetic backups without copying and/or transmitting large amounts of data, thereby improving the efficiency of computational resources to generate backups. For additional information regarding the use of the fast copy feature to generate virtual synthetic backups, refer to FIG. 3B.

In one or more embodiments of the invention, the backup storage (120) includes a file system manager (122). The file system manager (122) may include functionality for generating full backups, incremental backups, and virtual synthetic backups using copies of data blocks of assets of a file system obtained from the backup agent (112) of the production host (110). The file system manager may include the functionality to store the generated backups in persistent storage of the backup storage (120) and to generate backup metadata associated with the generated backups. The file system manager (122) may include the functionality to fast copy backups stored in the backup storage (120) in order to share the backup extents (discussed below) with intermediate backups in order to generate virtual synthetic backups as discussed in FIG. 3B using the fast copy feature of the file system operating on the backup storage (120). The file system metadata (122) may generate full backups, incremental backups, and virtual synthetic backups via the methods illustrated in FIGS. 3A-3B. The file system manager (122) may include other and/or additional functionality without departing from the invention.

In one or more embodiments of the invention, the file system manager (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the file system manager (122) described throughout this application.

In one or more embodiments of the invention, the file system manager (122) is implemented as computer instructions, e.g., computer code, stored on a persistent storage that when executed by a processor of the backup storage (120) causes the backup storage (120) to provide the functionality of the file system manager (122) described throughout this application.

In one or more embodiments of the invention, the persistent storage (124) stores data. The data stored in persistent storage (124) may include backups of data blocks associated with assets of a file system on the production host (110). The backups may be backup images stored in persistent storage (124) using virtual hard disk (VHDx) format. The VHDx files of the backups may represent a virtual hard disk drive and may include the data blocks associated with assets stored in the persistent storage of the production host (110). The VHDx files may include other and/or additional data without departing from the invention. The persistent storage (124) may store other and/or additional data without departing from the invention. For additional information regarding the persistent storage, refer to e.g., FIG. 1B.

The persistent storage (124) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (124) may utilize portions of any combination of hard disk drives, solid state disk drives, tape drives, and/or any other physical storage medium of any number of computing devices.

In one or more embodiments of the invention, the backup storage system (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (120) described throughout this application.

In one or more embodiments of the invention, the backup storage system (120) is implemented as a logical device. The logical device may utilize the computing resources of any number of computing devices and thereby provide the functionality of the backup storage system (120) described throughout this application.

Figure 1B:
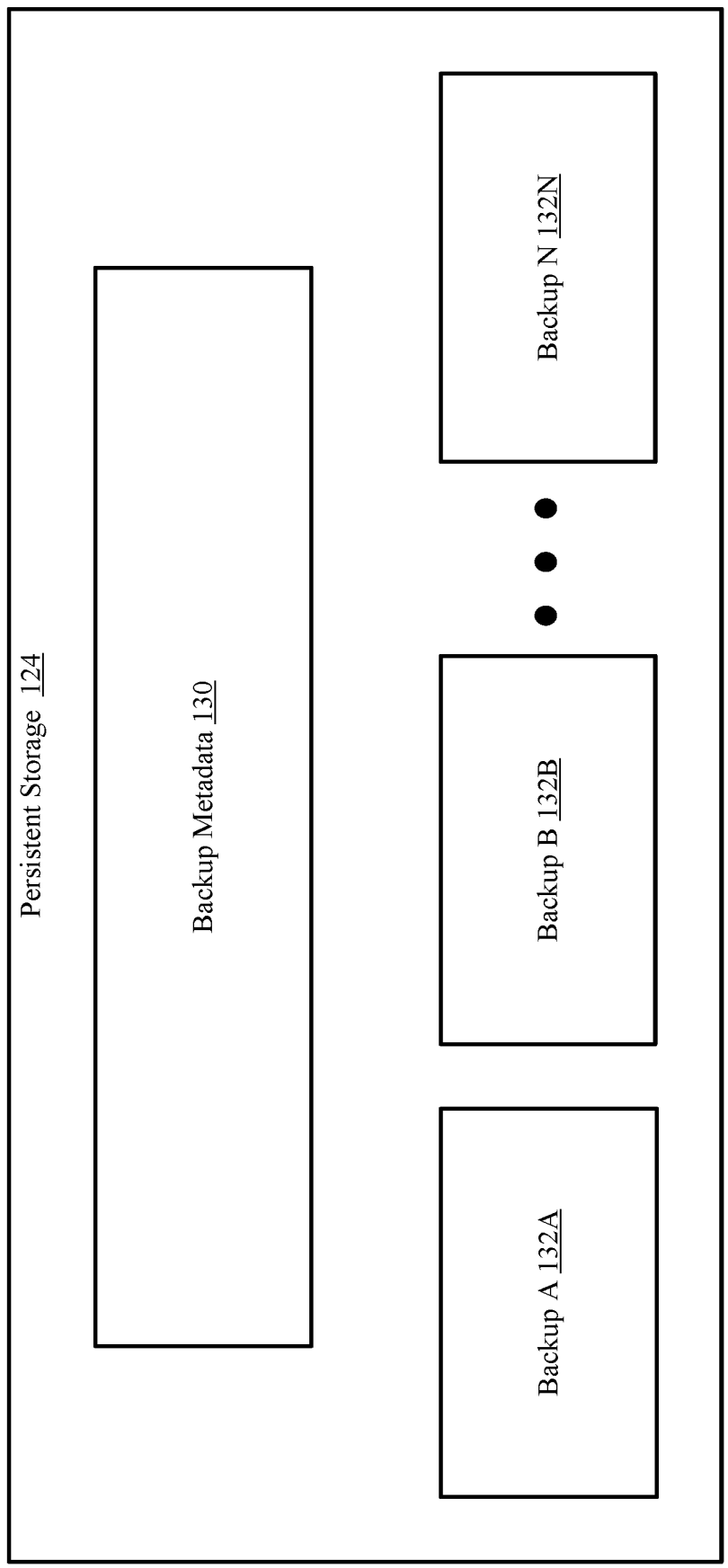
FIG. 1B shows a diagram of a persistent storage of a backup storage in accordance with one or more embodiments of the invention.

FIG. 1B shows a diagram of a persistent storage of a backup storage in accordance with one or more embodiments of the invention. The persistent storage (124, FIG.

1A) may be an embodiment of the persistent storage discussed above. As discussed above, the persistent storage stores data. The data may include one or more data structures. The data structures may include backup metadata (130), and one or more backups (e.g., backup A (132A), backup B (132B), and backup N (132N)). The persistent storage (124) may store other and/or additional data structures without departing from the invention. Each of the data structures is discussed below.

In one or more embodiments of the invention, the backup metadata (130) is one or more data structures that includes information regarding the backups (e.g., 132A, 132B, 132N) stored in the backup storage (120). For additional information regarding the backup metadata, refer to e.g., FIG. 2A.

In one or more embodiments of the invention, the backups (132A, 132B, 132N) are one or more data structures that include copies of data of assets of a file system hosted by the production host (110, FIG. 1A). The backups (132A, 132B, 132N) may be backup images stored in persistent storage (124) as files using virtual hard disk (VHDx) format as discussed above. For additional information regarding the backups (132A, 132B, 132N), refer to e.g., FIG. 2B.

Figure 2A:
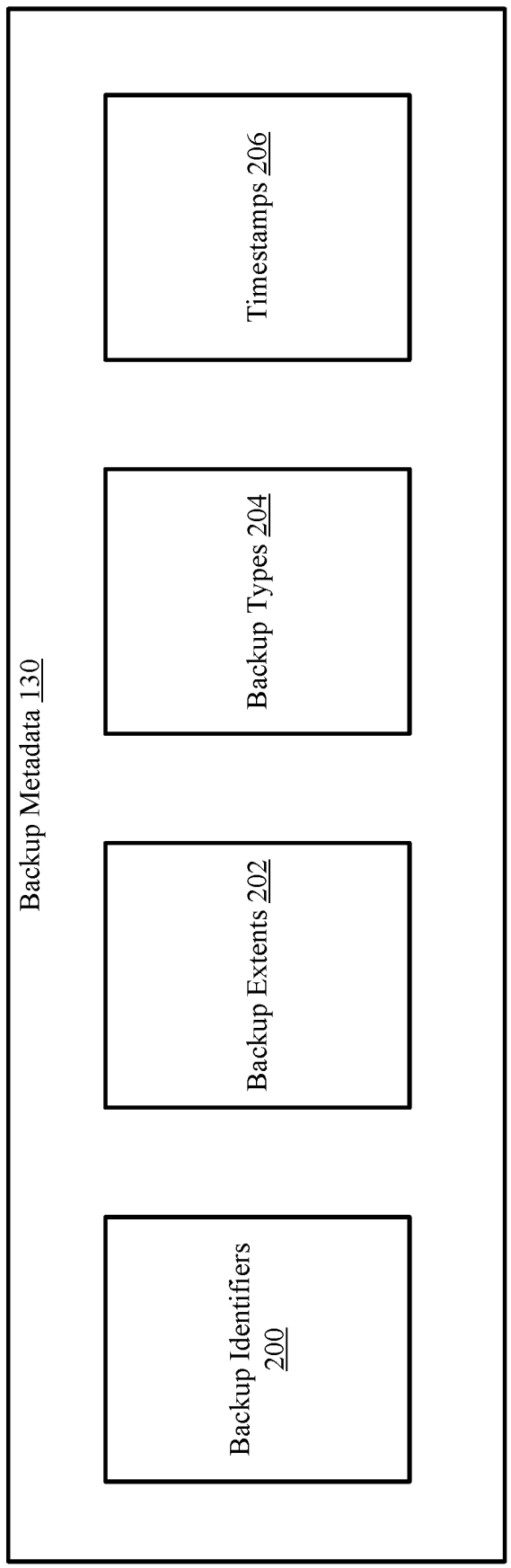
FIG. 2A shows a diagram of backup metadata in accordance with one or more embodiments of the invention.

FIG. 2A shows a diagram of backup metadata in accordance with one or more embodiments of the invention. The backup metadata (130) may be an embodiment of the backup metadata (130, FIG. 1B) discussed above. As discussed above, the backup metadata (130) may include information regarding backups (e.g., 132A, 132B, 132N) stored in the backup storage (120, FIG. 1A). The backup metadata (130) may include one or more data structures. The data structures may include backup identifiers (200), backup extents (202), backup types (204), and timestamps (206). The backup metadata (130) may include other and/or additional data structures and/or information without departing from the invention.

In one or more embodiments of the invention, the backup identifiers (200) are one or more data structures that are used to differentiate between backups stored in the backup storage (120, FIG. 1A). The backup identifiers (200) may be generated and assigned by the backup storage (120) when a backup is generated and stored in persistent storage (124). The backup identifiers (200) may be a unique combination of bits that are each associated with a backup stored in persistent storage (124). The file system manager (122) may use the backup identifiers (200) to perform all or a portion of the methods illustrated in FIGS. 3A-3B. The backup identifiers (200) may also include object identifiers, or a unique combination of bits included in the unique combination of bits of the backup identifier generated by the production host (110) that is associated with an object. The object identifiers may be used to identify backups associated with an object. The backup identifiers (200) may include other and/or additional information and may be used for other and/or additional purposes without departing from the invention.

In one or more embodiments of the invention, the backup extents (202) are one or more data structures that specify where a data block and/or portions of data blocks of a backup begin and end in the persistent storage (124) of the backup storage (120, FIG. 1A). The backup extents (202) may be obtained by the file system manager (122, FIG. 1A) using an input-output control (IOCTL) call to the file system operating on the backup storage that specifies a backup stored in the backup storage (120, FIG. 1A) as discussed in FIG. 3B. In response to the IOCTL call, the file system manager (122) obtains the backup extents associated with the specified backup. The backup extents (202) may be pointers that reference locations in persistent storage (124, FIG. 1A) where a data block of a backup begins and ends. The backup extents (202) may be used to identify where in persistent storage data of data blocks are stored. Each backup extent of the backup extents (202) may be associated with a data block of a backup. The backup extents (202) may be used by the file system manager (122, FIG. 1A) to generate intermediate backups and virtual synthetic backups via all or a portion of the methods illustrated in FIGS. 3A-3B. The backup extents (202) may include other and/or additional information and may be used for other and/or additional purposes without departing from the invention.

In one or more embodiments of the invention, the backup types (204) are one or more data structures that specify the types of backups stored in the backup storage (120). The backup types (204) may specify the type of backup of the backups associated with the backup types. The backup types (204) may include full backups, intermediate backups, and virtual synthetic backups. The backups types may be used by the file system manager (122, FIG. 1A) to identify backups of a specific type via all or a portion of the methods depicted in FIGS. 3A-3B. The backup types (204) may include other and/or additional information and may be used for other and/or additional purposes without departing from the invention. Each of the backup types is discussed below.

A full backup may be a backup that includes all of the data of the data blocks of an object. An intermediate backup may be a backup that includes the backup extents (202) of a previous full or virtual synthetic backup. The intermediate backups may not include data of data blocks. Intermediate backups may be updated using modified data blocks to generate virtual synthetic backups. The virtual synthetic backups may be backups that include backup extents of a previous full backup or virtual synthetic backup included in an intermediate backup and data of data blocks that were modified since the generation of the previous full backup or virtual synthetic backup associated with the intermediate backup. The aforementioned backup types may include other and/or additional information without departing from the invention.

The backup types (204) may be denoted in the backup metadata (130) via flags. The backup flags may include full backup flags, intermediate backup flags, and virtual synthetic flags. The backup metadata (130) associated with a backup may include flags for each backup type of the backup types (204). The backup type associated with the flag that is set may correspond to the type of backup that is associated with a backup. For example, the backup types (204) included in the backup metadata (130) for a backup may include a full backup flag that is set, an intermediate flag that is not set, and a virtual synthetic flag that is not set. Based on the flags, the backup type of the backup in this scenario is a full backup. Backup types (204) may be denoted via other and/or additional information included in the backup metadata without departing from the invention.

In one or more embodiments of the invention, the timestamps (206) are one or more data structures that specify the time when backups are stored in the backup storage (120). The timestamps may be generated by the file system manager (122, FIG. 1A) when a backup is generated and stored in the persistent storage (124, FIG. 1A) of the backup storage (120, FIG. 1A). The timestamps (206) may be used by the file system manager (122, FIG. 1A) to identifier the most recent previously generated backups when generating a synthetic backup. Each backup stored in the backup storage (120, FIG. 1A) may be associated with a timestamp. The timestamps (206) may include a date and a time that represent when a backup was generated. The timestamps (206) may include other and/or additional information regarding when a backup was generated without departing from the invention.

Figure 2B:
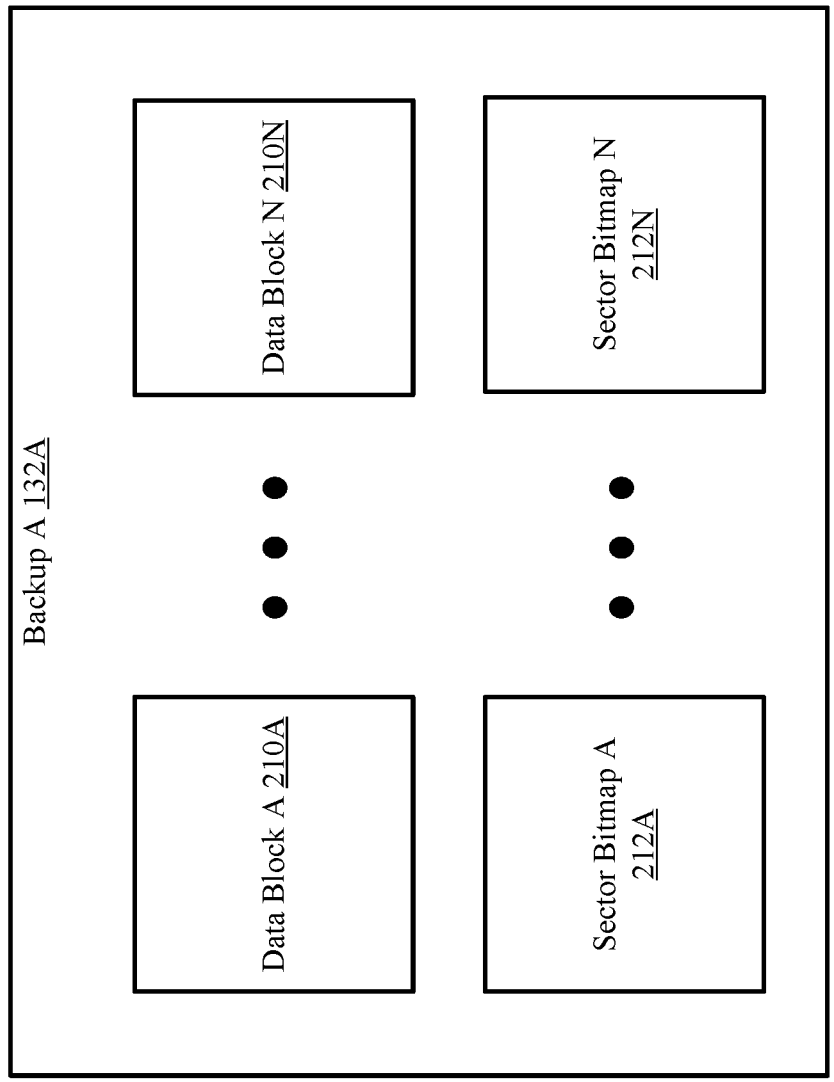
FIG. 2B shows a diagram of a backup in accordance with one or more embodiments of the invention.

FIG. 2B shows a diagram of a backup in accordance with one or more embodiments of the invention. The backup (132A) may be an embodiment of backup A (132A, FIG. 1B) discussed above. As discussed above, backup A may include data of an asset of the file system of the production host (110, FIG. 1A). Backup A (132A) may be one or more data structures. The data structures may include one or more data blocks (e.g., data block A (210A), data block N (210N)) and one or more sector bitmaps (e.g., sector bitmap A (212A), sector bitmap N (212N)). Backup A (132A) may include other and/or additional data structures and/or information without departing from the invention.

In one embodiment of the invention, each data block (e.g., 210A, 210N) may refer to a sequence of physically adjacent bytes of data associated with an object that was backed up. A backup may include any number of data blocks (e.g., 210A, 210N). Each data block (e.g., 210A, 210N) may include any amount of data (e.g., 1 MB, 1 GB, etc.) without departing from the invention. Each data block (e.g., 210A, 210N) associated with a backup may include the same amount of data. The data blocks (e.g., 210A, 210N) may be used to restore an object on the production host (110, FIG. 1A) that was corrupted and/or lost for any reason without departing from the invention.

In one embodiment of the invention, a sector bitmap (e.g., 212A, 212N) may refer to a bit array that indicates descriptive information pertaining to the data blocks (e.g., 210A, 210N) of a backup (e.g., 132A). Specifically, for a non-differencing disk of the persistent storage (124, FIG. 1A), the sector bitmaps (e.g., 212A, 212N) may distinguish which one or more disk sectors (i.e., portions of the disk) of the may be occupied with data and, conversely, which one or more other disk sectors may yet to be populated with data. The sector bitmaps (e.g., 212A, 212N) may distinguish which one or more disk sectors of the backup stored in persistent storage (124, FIG. 1A) may represent data that has been changed in reference to a previously generated backup associated with the aforementioned backup. The sector bitmap (e.g., 212A, 212N) may also distinguish which one or more other disk sectors may represent unchanged data respective to the data of the previously generated backup stored in the persistent storage (124).

Figure 3A:
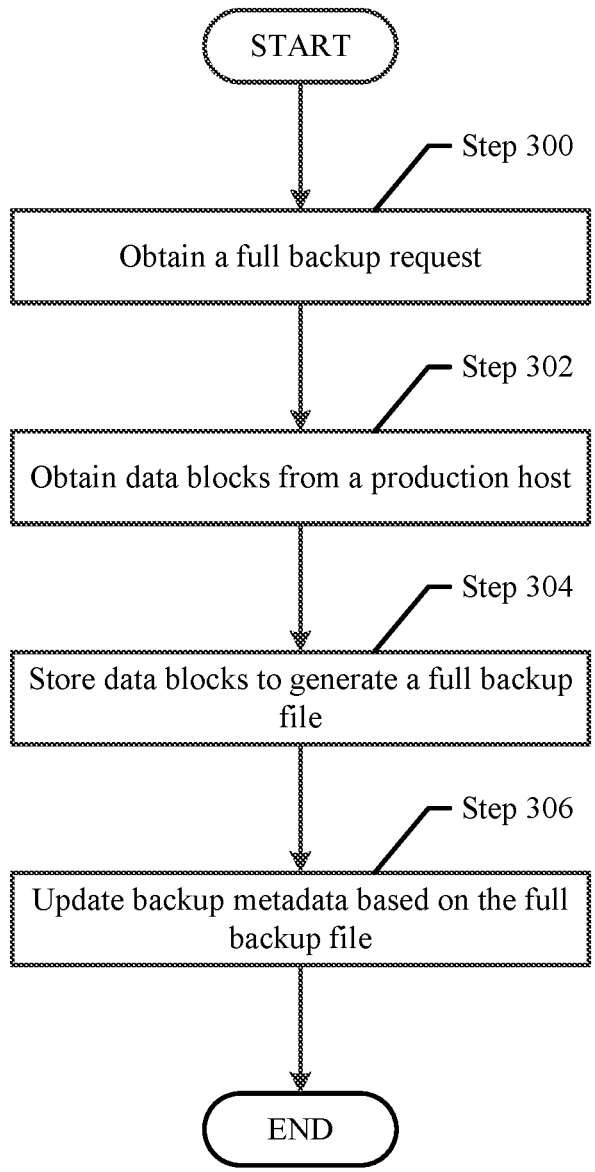
FIG. 3A shows a flowchart of a method for generating a full backup in accordance with one or more embodiments of the invention.

FIG. 3A shows a flowchart of a method for generating a full backup in accordance with one or more embodiments of the invention. The method shown in FIG. 3A may be performed by, for example, a backup storage (120, FIG. 1A). Other components of the system illustrated in FIG. 1A may perform all, or a portion, of the method of FIG. 3A without departing from the invention. While various steps in the flowchart are presented and described sequentially, one of ordinary skill in the relevant are will appreciate that some or all of the steps may be executed in different orders, may be combined or omitted, and some or all of the steps may be executed in parallel.

In step 300, a full backup request is obtained. In one or more embodiments of the invention, the production host sends a message to the backup storage. The message may include a request to generate a full backup of an object. The request may specify the object. The request may be obtained from the production host via other and/or additional methods without departing from the invention.

In step 302, data blocks are obtained from a production host. In one or more embodiments of the invention, the backup storage sends a message to the production host. The message may include a request for data blocks of the object associated with the full backup request. In response to obtaining the request, the production host may generate copies of the data blocks associated with the object and send the copies of the data blocks to the backup storage. The data blocks may be obtained from the production host via other and/or additional methods without departing from the invention.

In step 304, data blocks are stored to generate a full backup file. In one or more embodiments of the invention, the data blocks are stored in persistent storage of the backup storage. The data blocks may be written to persistent storage sequentially. The sector bitmaps associated with the data blocks may also be updated to indicate that each data block stored in a portion of the portion of the persistent storage includes data and is associated with a full backup. The data blocks may be stored to generate a full backup file via other and/or additional methods without departing from the invention.

In step 306, the backup metadata is updated based on the full backup file. In one or more embodiments of the invention, a backup identifier, backup extents, backup type, and a timestamp associated with the full backup file are generated. The backup storage may generate a backup identifier associated with the full backup file that may be used to differentiate the full backup file from other backup files stored in persistent storage of the backup storage. The backup identifier may be included in the backup metadata. The backup storage may also generate backup extents associated with the backup storage file. The backup extents may reference the beginning and end of the data blocks of the full backup file in persistent storage of the backup storage. The backup extents may be included in the backup metadata. The backup storage may generate a backup type associated with the full backup file. The backup storage may indicate that the full backup file is a full backup by setting a flag associated with a full backup type and including the flag in the backup metadata. The backup storage may also generate a timestamp by including the date and time the full backup file was generated in the backup metadata. The backup storage may also include the object identifier associated with the backed up object included in the full backup file with the backup metadata. The object identifier may be associated with the full backup file. The backup metadata may be updated based on the full backup file via other and/or additional methods without departing from the invention.

The method may end following step 306.

Figure 3B:
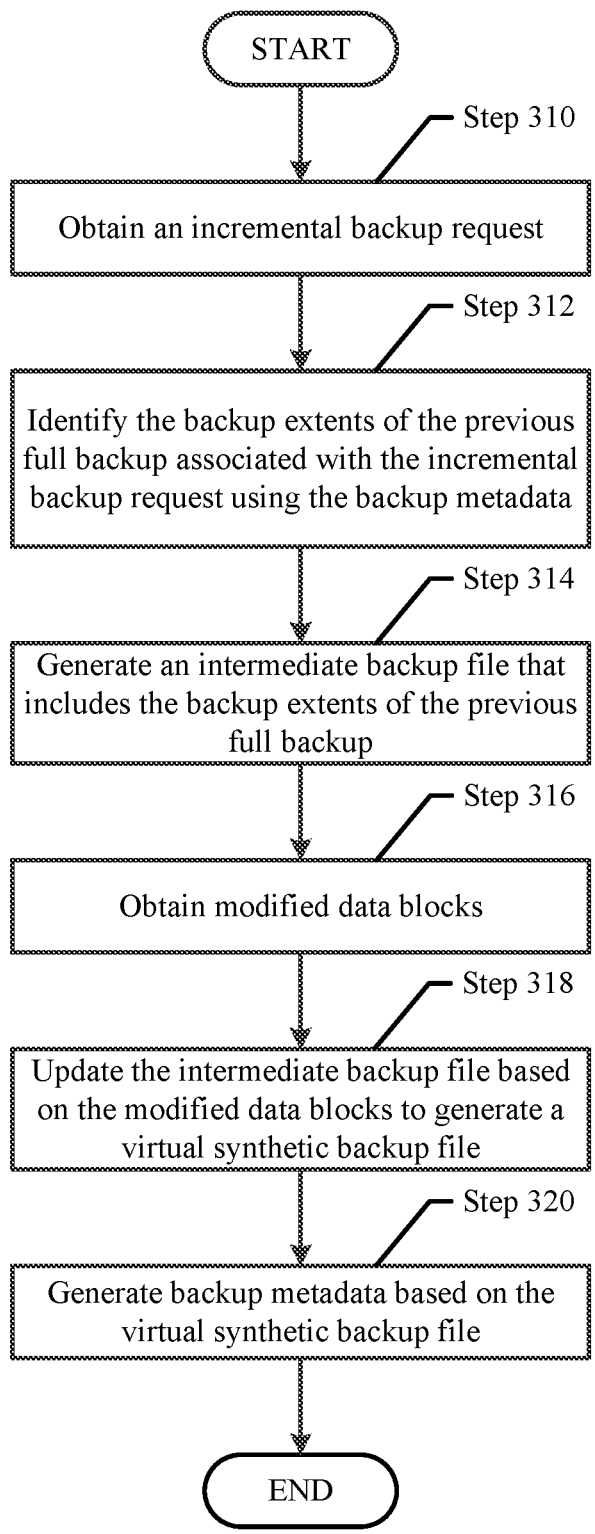
FIG. 3B shows a flowchart of a method for generating a virtual synthetic backup using an incremental backup in accordance with one or more embodiments of the invention.

FIG. 3B shows a flowchart of a method for generating a virtual synthetic backup using an incremental backup in accordance with one or more embodiments of the invention. The method shown in FIG. 3B may be performed by, for example, a backup storage (120, FIG. 1A). Other components of the system illustrated in FIG. 1A may perform all, or a portion, of the method of FIG. 3B without departing from the invention. While various steps in the flowchart are presented and described sequentially, one of ordinary skill in the relevant are will appreciate that some or all of the steps may be executed in different orders, may be combined or omitted, and some or all of the steps may be executed in parallel.

In step 310, an incremental backup request is obtained. In one or more embodiments of the invention, the production host sends a message to the backup storage. The message may include a request to generate a virtual synthetic backup of an object. The request may specify the object. The incremental backup request may be obtained from the production host via other and/or additional methods without departing from the invention.

In step 312, the backup extents of the previous full backup associated with the incremental backup request are identified using the backup metadata. In one or more embodiments of the invention, the backup extents of the previous full backup associated with the incremental backup request are identified using the IOCTL call as discussed above. The IOCTL call may include object identifiers, backup identifiers, backup types, and a timestamp associated with the specified previous full backup. The backup storage may send the IOCTL call to the file system manager. In response to obtaining the IOCTL call, the file system manager may identify all backups stored in persistent storage of the backup storage that are associated with the object using the object identifier associated with the object included in the IOCTL call. The file system manager may then identify the backups associated with the object that are full backups using the backup types included in the IOCTL call. The file system manager may then identify the most recent full backup associated with the object using the timestamps associated with the backups included in the IOCTL call. The file system manager may provide the backup extents associated with the most recent full backup to the backup storage. The backup storage may then identify the backup extents of the identified most recent full backup as the backup extents of the previous full backup associated with the incremental backup request. The backup extents of the previous full backup associated with the incremental backup request may be identified using the backup metadata via other and/or additional methods without departing from the invention.

In step 314, an intermediate backup file is generated that includes the backup extents of the previous full backup. In one or more embodiments of the invention, the backup storage sends another IOCTL call to the file system manager to share identified extents with the intermediate backup file. In response to the IOCTL call, the file system manager may generate the intermediate backup file and share the backup extents of the previous full backup with the intermediate backup file using the fast copy feature included in the file system operating on the backup storage. The intermediate backup file may include only the backup extents of the previous full backup file associated with the intermediate file. In other words, the intermediate backup file may include only references to the storage locations of the data blocks of the previously generated full backup file. The intermediate backup file may be generated via other and/or additional methods without departing from the invention.

In step 316, modified data blocks are obtained. In one or more embodiments of the invention, the backup storage sends a message to the production host. The message may include a request for data blocks of the object associated with the incremental backup request that have been modified since the previously generated full backup file. The request may include a timestamp associated with the previously generated full backup file. In response to obtaining the request, the production host may use the changed block tracking driver to identify data blocks associated with the object that have been modified since the timestamp included in the message. The production host may generate copies of the identified data blocks associated with the object that have been modified after the time depicted in the timestamp included in the request and may send the copies of the modified data blocks to the backup storage. The modified data blocks may be obtained from the production host via other and/or additional methods without departing from the invention.

In step 318, the intermediate backup file is updated based on the modified data blocks to generate a virtual synthetic backup file. In one or more embodiments of the invention, the modified data blocks are included in the intermediate backup file. The file system manager of the backup storage may store the modified data blocks in persistent storage of the backup storage to generate the virtual synthetic backup file. The file system manager of the backup storage may delete, overwrite, and/or update the backup extents of the previous full backup file included in the intermediate backup file that are associated with the modified data blocks. The sector bitmaps associated with the modified data blocks may be updated to indicate that each modified data block includes data and is associated with a full backup. The sector bitmaps may also include entries associated with the backup extents of the previously generated full backup file that indicate that the data associated with the backup extents included in the virtual synthetic backup are stored in another backup file and were unchanged as of the generation of the virtual synthetic backup. The intermediate backup file may be updated based on the modified data blocks to generate a virtual synthetic backup file via other and/or additional methods without departing from the invention.

In step 320, backup metadata is generated based on the virtual synthetic backup file. In one or more embodiments of the invention, a backup identifier, backup extents, backup type, and a timestamp associated with the full backup file are generated. The backup storage may generate a backup identifier associated with the virtual synthetic backup file that may be used to differentiate the virtual synthetic backup file from other backup files stored in persistent storage of the backup storage. The backup identifier may be included in the backup metadata. The backup storage may also generate backup extents associated with the backup storage file. The backup extents may reference the beginning and end of the modified data blocks of the virtual synthetic backup file stored in persistent storage of the backup storage. The backup extents may be included in the backup metadata. The backup storage may generate a backup type associated with the virtual synthetic backup file. The backup storage may indicate that the virtual synthetic backup file is a virtual synthetic backup by setting a flag associated with a virtual synthetic backup type and including the flag in the backup metadata. The backup storage may also generate a timestamp by including the date and time the virtual synthetic backup file was generated in the backup metadata. The backup storage may also include the object identifier associated with the backed up object included in the virtual synthetic backup file with the backup metadata. The object identifier may be associated with the virtual synthetic backup file. The backup metadata may be updated based on the virtual synthetic backup file via other and/or additional methods without departing from the invention.

The method may end following step 320.

Example

Figure 4A:
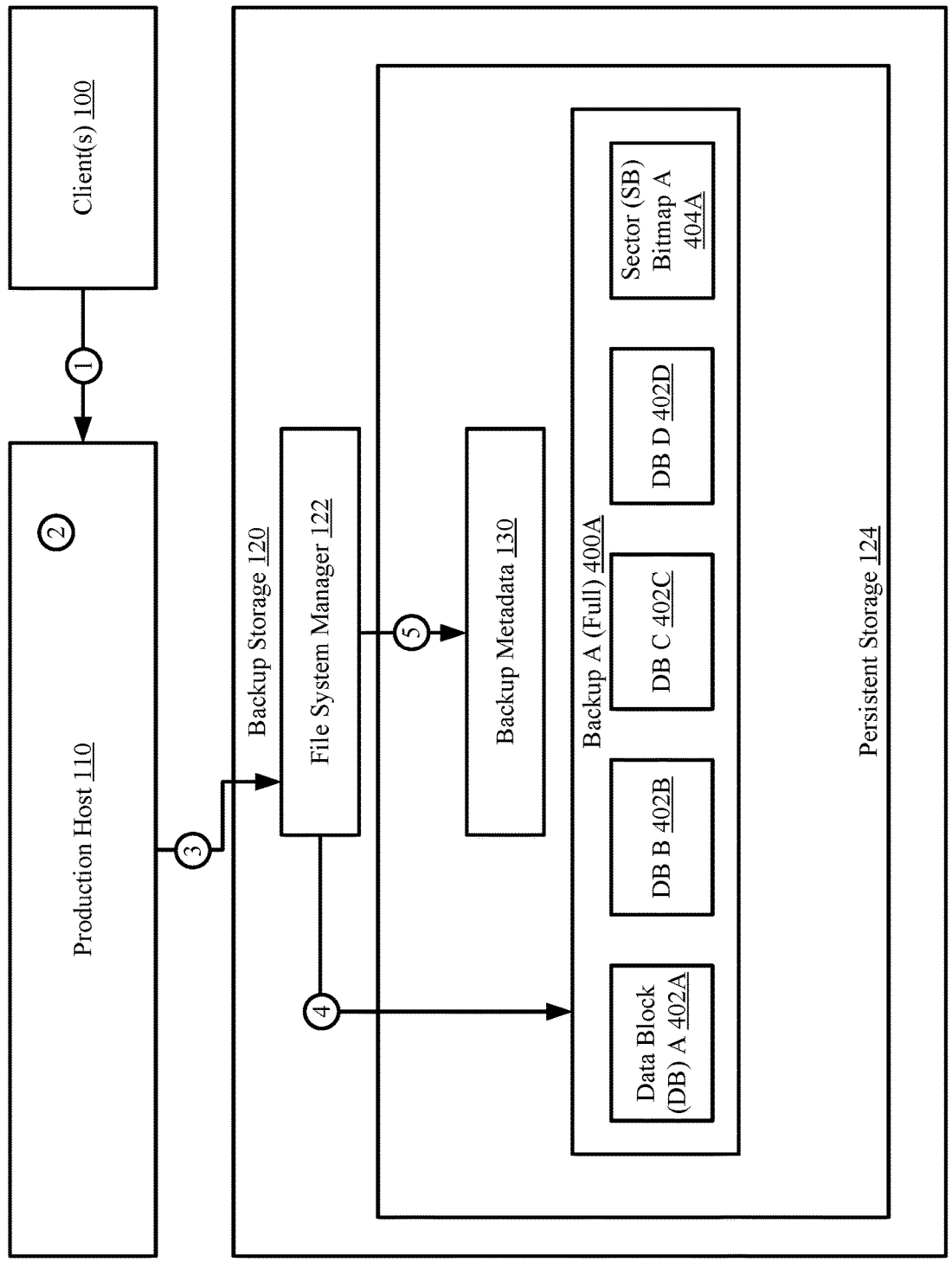
FIG. 4A shows a diagram of a first example in accordance with one or more embodiments of the invention.
Figure 4B:
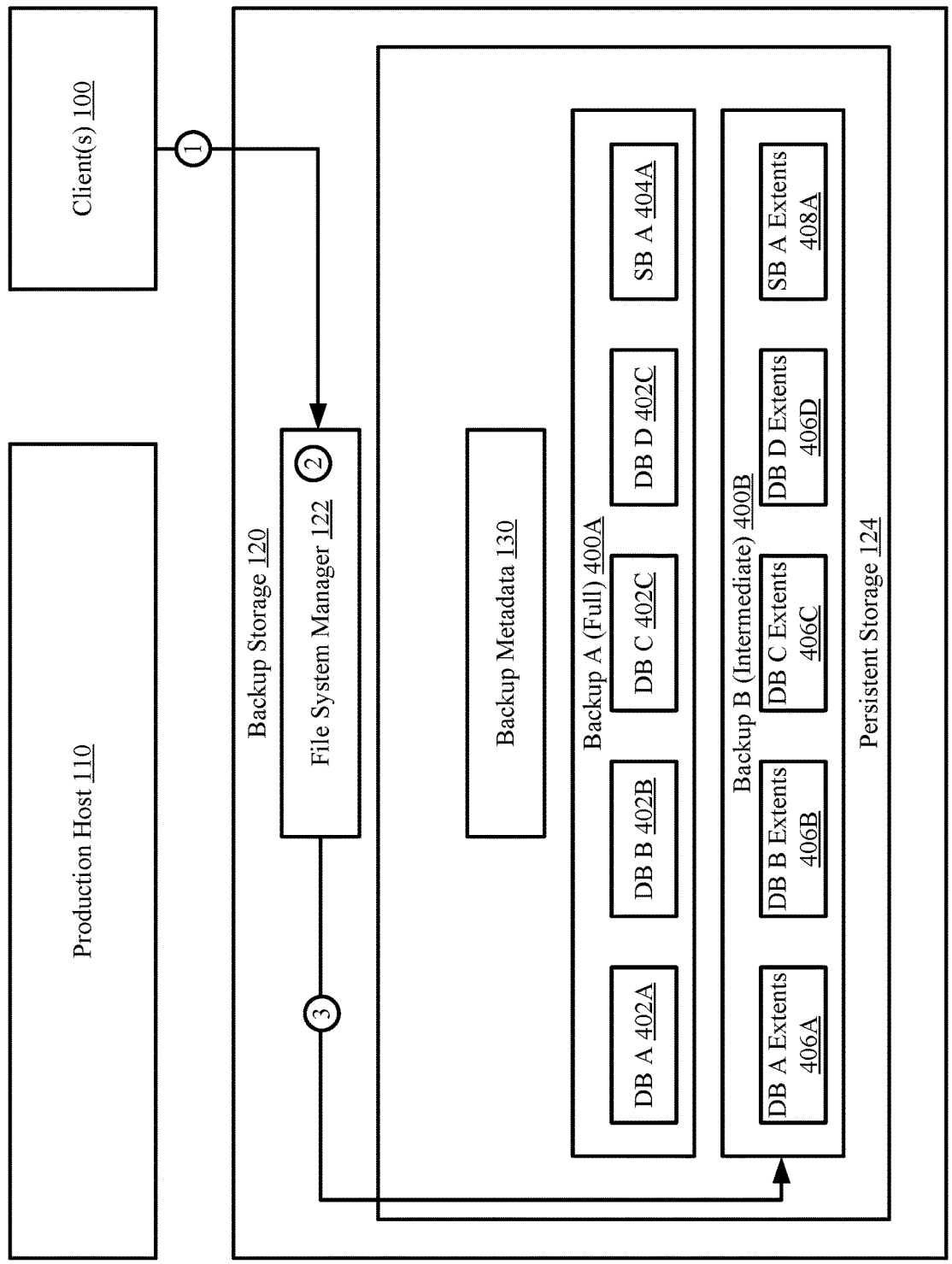
FIGS. 4B-4C show diagrams of a second example in accordance with one or more embodiments of the invention.
Figure 4C:
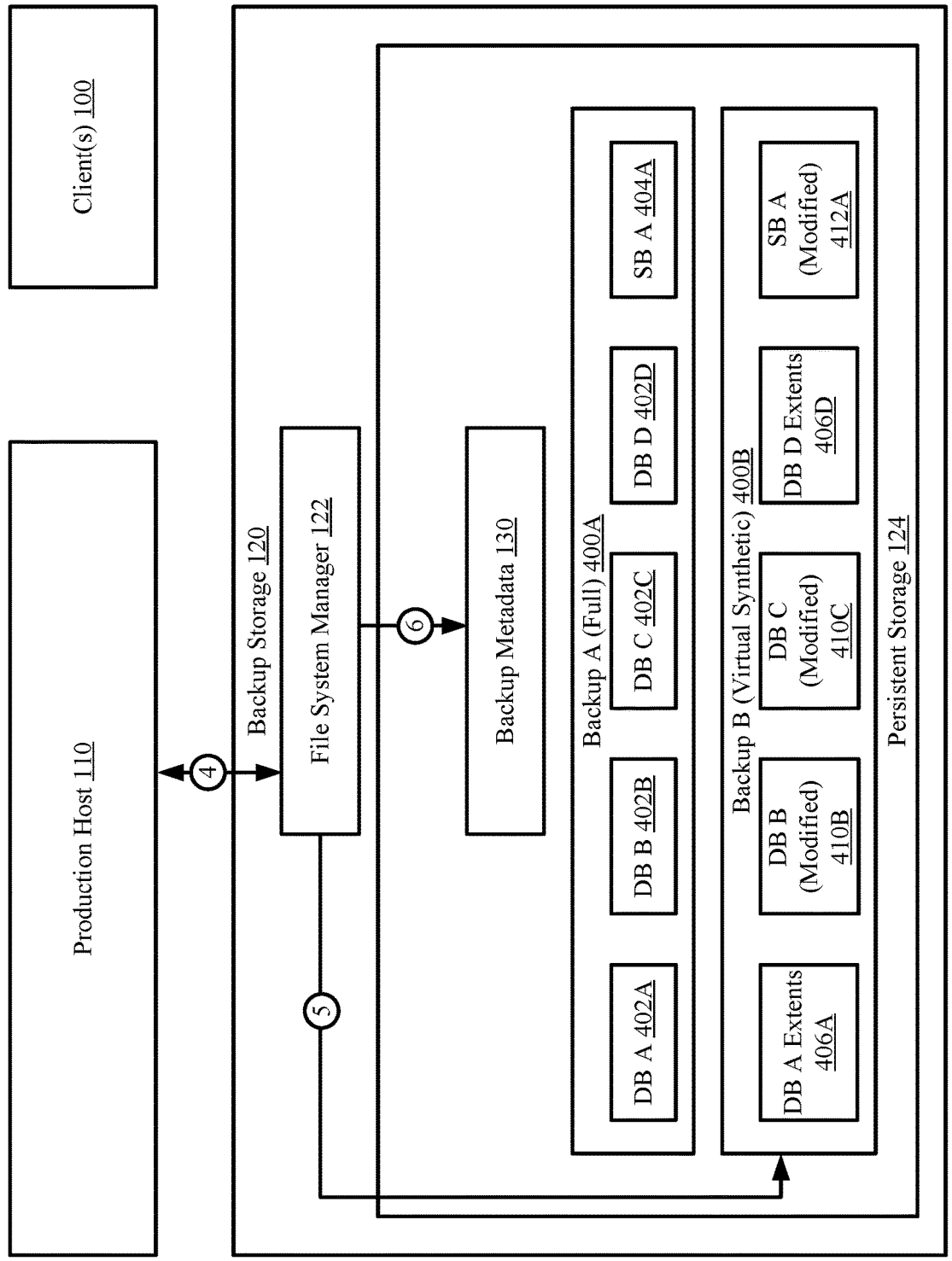

The following section describes two examples. The examples are not intended to limit the invention. The examples are illustrated in FIGS. 4A-4C. Turning to the first example, consider a scenario in which a backup storage stores a full backup of data obtained from a production host.

FIG. 4A shows a diagram of a first example in accordance with one or more embodiments of the invention. As discussed above, a backup storage (120) is generating a full backup of data obtained from a production host (110) as requested by a client(s) (100). The backup storage (120) includes a file system manager (122) and persistent storage (124). At a first point in time, the client(s) (100) sends a request to the production host (110) to generate a backup of an object [1]. In response to the request, the production host (110) generates copies of data blocks associated with the object [2]. The production host (110) then sends the data blocks to the file system manager (122) of the backup storage (120) and requests a full backup be generated using the data blocks [3]. In response to obtaining the data blocks, the file system manager (122) generates backup A (400A) and stores backup A (400A) in persistent storage (124) [4]. Backup A (400A) is a full backup and includes data block (DB) A (402A), DB B (402B), DB C (402C), DB D (402D), and sector bitmap (SB) A (404A). After storing backup A (400A) in persistent storage (124), the file system manager (122) updates backup metadata (130) based on backup A (400A) [5].

Turning to the second example, consider a scenario in which a backup storage generates a virtual synthetic backup of the object discussed above in the first example at a later point in time depicted in FIG. 4A.

FIGS. 4B-4C show a diagram of a second example in accordance with one or more embodiments of the invention. Turning to FIG. 4B, as discussed above, a backup storage (120) is generated using a virtual synthetic backup of the object obtained from a production host (110) as requested by a client(s) (100). The backup storage (120) includes a file system manager (122) and persistent storage (124). At a first point in time (after the time depicted in FIG. 4A), the client(s) (100) sends a request to the backup storage (120) to generate a virtual synthetic backup of the object [1]. In response to the request, the backup storage (120) identifies the backup extents associated with the previously generated full backup (i.e., backup A (400A), which includes DB A (402A), DB B (402B), DB C (402C), DB D (402D), and sector bitmap (SB) A (404A)) using an IOCTL call [2]. The backup storage (120) then generates backup B (400B) [3] using the identified backup extents and another IOCTL call to share the identified backup extents with backup B (400B). Backup B (400B) is an intermediate backup. Backup B (400B) includes DB extents A (406A), DB extents B (406B), DB extents C (406C), DB extents D (406D), and SB extents A (408A).

Turning to FIG. 4C, after generating backup B (400B), the file system manager (122) sends a request for modified data blocks associated with the object. The modified data blocks included data blocks of the object that were modified after the generation of backup A (400A) and prior to the generation of backup B (400B). In response to obtaining the request, the production host (110) uses a changed block tracking driver to identify blocks that have been modified since the generation of backup A (400A) and generates copies of the modified data blocks of the object as specified by the request, and then sends the modified data block copies to the file system manager (122) [4]. In this scenario, DB B (402B) and DB C (402C) were modified since the generation of backup A (400A). After obtaining the modified data blocks, the file system manager updates backup B (400B) based on the modified data blocks [5]. Backup B (400B) is now a virtual synthetic backup. Backup B (400B) now includes DB A extents (406A), modified DB B (410B), modified DB C (410C), DB D extents (406D), and modified SB A (412A), which was updated based on the modified blocks and the backup extents. After updating backup B (400B) to generate a virtual synthetic backup, the file system manager (122) updates backup metadata (130) based on the updated backup B (400B) [6].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating virtual synthetic block based backups using the fast copy feature of the file system operating on the backup storage. An intermediate backup associated with a previously generated full backup may be generated that includes the backup extents of the previously generated full backup that were shared using the fast copy feature. The intermediate backup may be updated to generate a virtual synthetic backup based on data blocks, obtained using a changed block tracking driver, that were modified following the generation of the previously generated full backup. Further, the virtual synthetic backups may include the backup extents that reference the storage locations associated with data blocks that were not modified between the generation of the previously generated full backup and the generation of the intermediate backup and the modified data blocks that were modified between the generation of the previously generated full backup and the generation of the intermediate backup.

In traditional systems, the unmodified data blocks may be copied from the previously generated full backup and/or obtained from a production host and included in synthetic backups. This may take up unnecessary computational resources of the backup storage and/or the production host. Embodiments of the invention improve the computational efficiency of generating block based backups by limiting the redundancy in use of computational resources and storage space using the fast copy feature of the file system of the backup storage to generate virtual synthetic backups.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for backing up data, the method comprising:
    obtaining, by a backup storage, an incremental backup request; and
    in response to the incremental backup request:
        identifying backup extents of a full backup associated with the incremental backup request using backup metadata, wherein a backup extent of the backup extents comprises:
            a first pointer that specifies a starting point of a data block of the full backup stored in the backup storage; and
            a second pointer that specifies an ending of the data block;
        generating an intermediate backup file, wherein generating the intermediate backup file comprises generating copies of the backup extents of the full backup and including the copies of the backup extents in the intermediate backup file;
        obtaining modified data blocks from a production host; and
        updating the intermediate backup file using the modified data blocks to generate a virtual synthetic backup file.

2. The method of claim 1, wherein the modified data blocks comprise data blocks of a full backup file that have been modified since generation of the full backup, wherein the data block of the full backup is one of the data blocks of the full backup file.

3. The method of claim 1, wherein the full back up is one selected from a group consisting a second virtual synthetic backup and a non-virtual full backup.

4. The method of claim 1, further comprising:
    prior to obtaining the incremental backup request:
        obtaining a full backup request;
        obtaining data blocks from the production host;
        storing the data blocks to generate a non-virtual full backup file; and
        updating backup metadata based on the non-virtual full backup file.

5. The method of claim 3, wherein the non-virtual full backup comprises the data blocks and sector bitmaps, wherein the data block of the full backup is one of the data blocks of the non-virtual full backup file.

6. The method of claim 5, wherein the sector bitmaps specify the data blocks of the non-virtual full backup.

7. A system for backing up data, comprising:
    a processor;
    a file system manager of a backup storage, which when executed by the processor performs a method, the method comprising:
    obtaining an incremental backup request; and
    in response to the incremental backup request:
        identifying backup extents of a full backup associated with the incremental backup request using backup metadata, wherein a backup extent of the backup extents comprises:
            a first pointer that specifies a starting point of a data block of the full backup stored in the backup storage; and
            a second pointer that specifies an ending point of the data block;
        generating an intermediate backup file, wherein generating the intermediate backup file comprises generating copies of the backup extents of the full backup and including the copies of the backup extents in the intermediate backup file;
        obtaining modified data blocks from a production host; and
        updating the intermediate backup file using the modified data blocks to generate a virtual synthetic backup file.

8. The system of claim 7, wherein the modified data blocks comprise data blocks of a full backup file that have been modified since generation of the full backup, wherein the data block of the full backup is one of the data blocks of the full backup file.

9. The system of claim 7, wherein the full back up is one selected from a group consisting of a second virtual synthetic backup and a non-virtual full backup.

10. The system of claim 7, wherein the method further comprising:
    prior to obtaining the incremental backup request:
        obtaining a full backup request;
        obtaining data blocks from the production host;
        storing the data blocks to generate a non-virtual full backup file; and
        updating backup metadata based on the non-virtual full backup file.

11. The system of claim 9, wherein the non-virtual full backup comprises the data blocks and sector bitmaps, wherein the data block of the full backup is one of the data blocks of the non-virtual full backup file.

12. The system of claim 11, wherein the sector bitmaps specify the data blocks of the non-virtual full backup.

13. A non-transitory computer readable medium comprising computer readable program code, which when executed by a computer processor enables the computer processor to perform a method for backing up data, the method comprising:
  obtaining an incremental backup request; and
  in response to the incremental backup request:
    identifying backup extents of a full backup associated with the incremental backup request using backup metadata, wherein a backup extent of the backup extents comprises:
      a first pointer that specifies a starting point of a data block of the full backup stored in the backup storage; and
      a second pointer that specifies an ending point of the data block;
    generating an intermediate backup file, wherein generating the intermediate backup file comprises generating copies of the backup extents of the full backup and including the copies of the backup extents in the intermediate backup file;
    obtaining modified data blocks from a production host; and
    updating the intermediate backup file using the modified data blocks to generate a virtual synthetic backup file.

14. The non-transitory computer readable medium of claim 13, wherein the modified data blocks comprise data blocks of a full backup file that have been modified since generation of the full backup, wherein the data block of the full backup is one of the data blocks of the full backup file.

15. The non-transitory computer readable medium of claim 13, wherein the full back up is one selected from a group consisting of a second virtual synthetic backup and a non-virtual full backup.

16. The non-transitory computer readable medium of claim 13, wherein the method further comprising:
  prior to obtaining the incremental backup request:
    obtaining a full backup request;
    obtaining data blocks from the production host;
    storing the data blocks to generate a non-virtual full backup file; and
    updating backup metadata based on the non-virtual full backup file.

17. The non-transitory computer readable medium of claim 15, wherein the non-virtual full backup comprises the data blocks and sector bitmaps, wherein the data block of the full backup is one of the data blocks of the non-virtual full backup file.

* * * * *